UNITED STATES PATENT OFFICE.

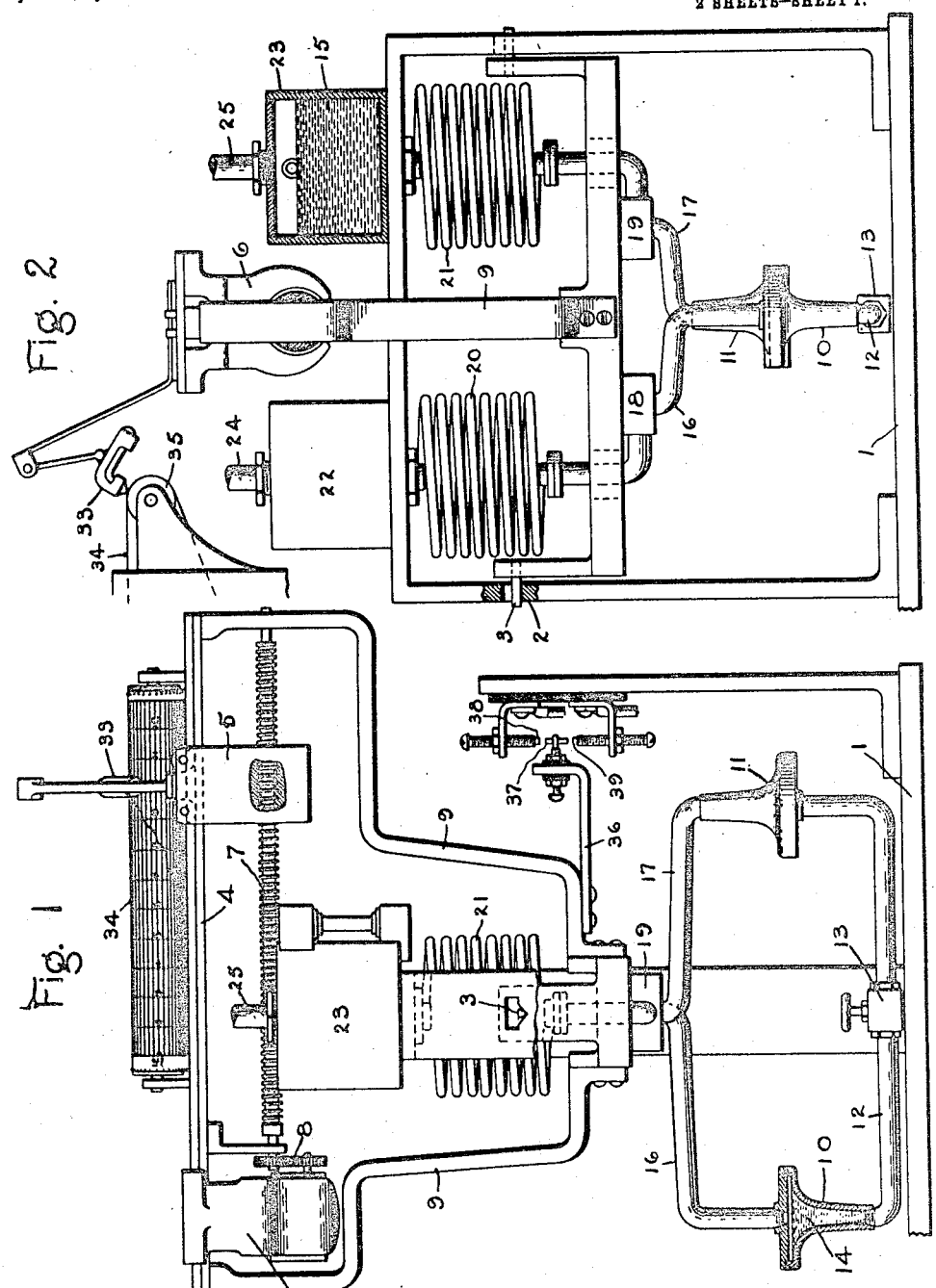
H. H. MAPELSDEN.
FLUID FLOW METER.
APPLICATION FILED SEPT. 11, 1908.
1,076,656.
Patented Oct. 21, 1913.
2 SHEETS—SHEET 1.
Witnesses:
Inventor:
Harold H. Mapelsden,

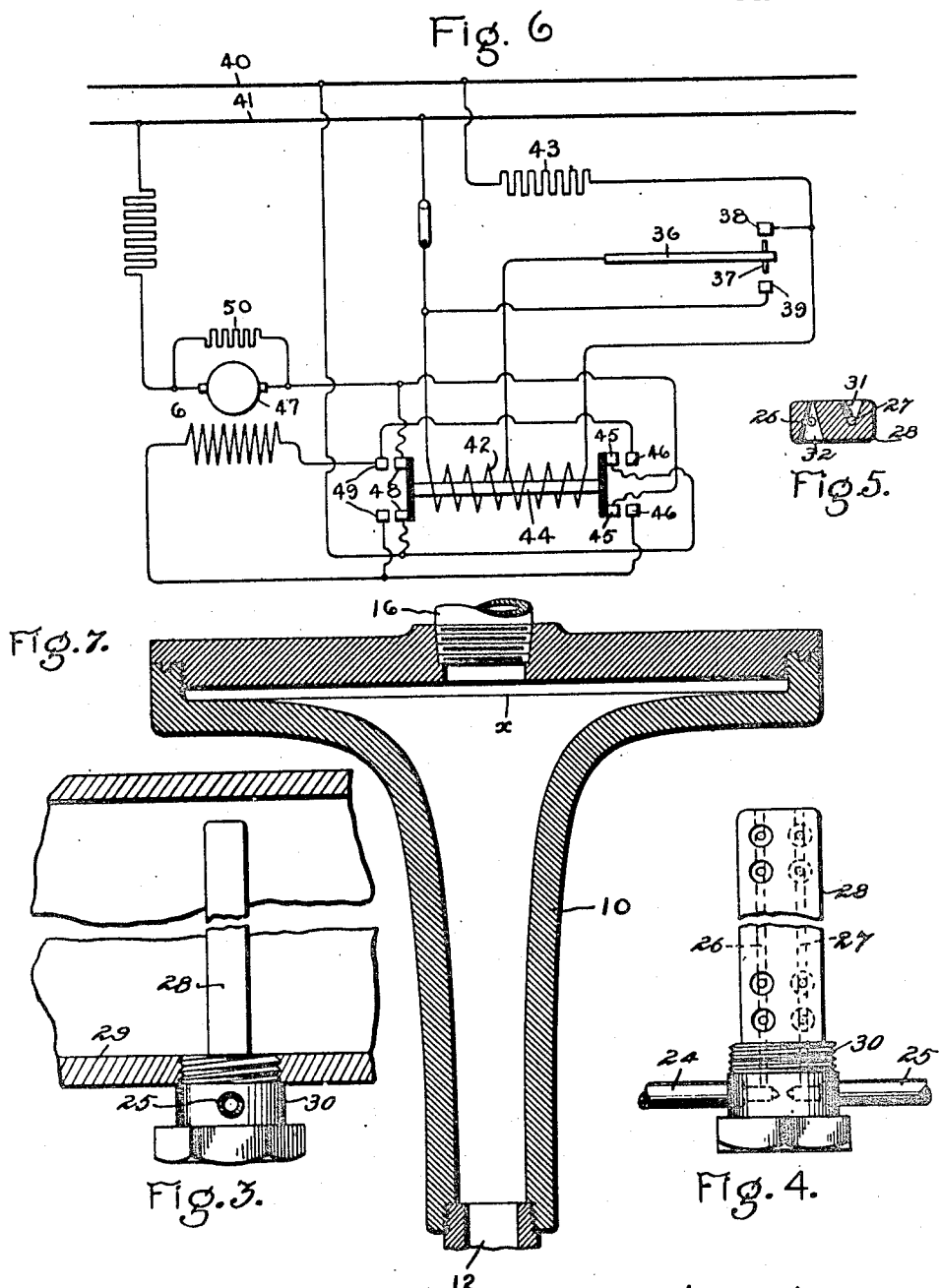

HAROLD H. MAPELSDEN, OF SCHENECTADY, NEW YORK, ASSIGNOR TO GENERAL ELECTRIC COMPANY, A CORPORATION OF NEW YORK.

FLUID-FLOW METER.

1,076,656.  Specification of Letters Patent.  Patented Oct. 21, 1913.

Application filed September 11, 1908. Serial No. 452,546.

*To all whom it may concern:*

Be it known that I, HAROLD H. MAPELSDEN, a citizen of the United States, residing at Schenectady, county of Schenectady, State of New York, have invented certain new and useful Improvements in Fluid-Flow Meters, of which the following is a specification.

This invention relates to apparatus for indicating and recording the flow of steam or other fluids through pipes, and has especial reference to that form of such apparatus as appears in the pending application of A. R. Dodge, Serial No. 421,696. It will, therefore, be described and illustrated in connection with that particular meter, but the application of it to other forms of similar apparatus is not thereby abandoned.

In this meter an agent or device for creating a pressure difference having a definite relation to the rate of flow is inserted in the main in which the flow is to be measured. The agent illustrated comprises two funnels or sets of funnels or openings facing in different directions, one funnel or set to receive the impact of the steam or other fluid and the other to cause a suction due to the flow of steam. The agent is connected with two communicating mercury cups mounted on a beam suitably fulcrumed and carrying a sliding weight. Any variation in steam flow causes a differential pressure on the mercury in the cups, whereby the mercury shifts from one to the other and tilts the beam. The weight is then moved to restore the equilibrium, and the extent of such movement is an indication of the change in flow of the steam, while the position of the weight along a graduated scale may indicate the actual flow of steam in pounds per unit of time.

My invention consists in a peculiar shape of the mercury cups by which the readings of the instrument are much simplified.

The specific features of novelty will appear from the following description and claims taken in connection with the accompanying drawings, in which—

Figure 1 is a side view of a flow meter embodying my invention; Fig. 2 is an end view of the same; Fig. 3 is an edge view of the agent by means of which the effect of changes in the rate of fluid flow in the main is communicated to the meter; Fig. 4 is a front view of the same removed from the main; Fig. 5 is a cross-section of the same; Fig. 6 is a diagram of the circuit connections of the motor, and Fig. 7 is a longitudinal section, on an enlarged scale, of one of the cups or containers which form the subject-matter of my invention.

The flow meter to which I have applied my invention is of the type set forth in the Dodge application, above referred to, and comprises a base 1 on which is supported a frame of suitable shape having seats 2 on opposite legs to support the knife-edges 3, on which is fulcrumed the movable element or beam 4. A weight 5 is equipped with rollers which ride on the finished upper surface of the beam, so that said weight can travel freely to and fro. An electric motor 6 is fastened to one end of the beam and is geared to a lead-screw 7 journaled in suitable bearings below the beam and running parallel therewith. This screw meshes with screw-threads tapped through the weight 5. Speed-reducing gearing 8 moderates the rate of rotation of said screw by the motor. The beam is mounted on a frame 9 which depends below the supporting knife-edges 3, and supports two mercury cups or containers 10, 11 whose lower ends are connected by a pipe 12 provided with a valve 13. The cups are preferably situated at equal distances from the knife-edges 3 so as to balance each other. The cups and the pipe 12 are partly filled with mercury or other relatively heavy liquid 14, on top of which is a body of water 15 due to the condensation of the steam. The cups are supported from the frame 9 by the pipes 16 and 17 which are fastened into blocks 18, 19 secured to the frame on either side of the vertical plane of the cups, and in the same vertical plane as the knife-edges 3.

Depending from the stationary frame of the apparatus are flexible connectors 20, 21 which convey water under pressure to the pipes 16, 17. Each connector is composed of a helical coil of flattened pipe, the axis of the coil being vertical and substantially in the vertical plane of the knife-edges 3. The connectors are connected at their upper ends, respectively, to the water reservoirs 22, 23, and at their lower ends, respectively, to the blocks 18, 19, the pipes 16, 17 and the mercury cups 10, 11.

The water reservoirs used when measuring steam or other condensable fluids are supported on the frame 1 and are connected by pipes 24, 25 with passages 26, 27 running parallel with each other and longitudinally through an agent or device 28 located in the main 29. The agent is mounted on a screw-threaded plug 30 which is screwed into a tapped hole in the main and holds said agent at right angles to the stream of steam flowing through said main. In the front face of the agent, against which the steam impinges, are several conical funnels or openings 31 communicating with passage 27. Conical holes 32 are drilled through the agent from its rear side, intersecting the passage 26. Variations in the velocity of flow of the steam produce differential variations in pressure in the openings 31 and 32, and these variations are communicated by the pipes 24, 25 to the water in the reservoirs 22, 23 and thence to the mercury in the cups 10, 11, causing a transfer of more or less mercury from one cup to the other and a consequent tilting of the beam 4. By moving the weight 5 along the beam until equilibrium is restored, an indication of the velocity of the steam is obtained, from which the quantity of steam can be calculated. To make a permanent record of the flow, a suitable marker 33 is attached to the weight to coöperate with a suitably ruled record sheet 34, which may be driven in any suitable manner over a roller 35.

The weight 5 is shifted to and fro by the motor 6, whose control circuits are shown in diagram in Fig. 6. Mounted on some part of the moving element of the meter is an arm 36 carrying an insulated contact 37. Adjustable contacts 38, 39 are secured to a fixed support and located on either side of the contact 37, the clearance between them being exaggerated in Fig. 1 for the sake of clearness in illustration. The contacts 38, 39 are connected, respectively, with the two mains 40, 41 of a suitable electric supply circuit. They are also connected with the terminals of the winding 42 of a solenoid relay magnet. The contact 37 is connected to the middle point of said winding. A resistance 43 reduces the flow of current through the solenoid. At one end of the solenoid core 44 is a bar carrying two insulated contacts 45 which coöperate with stationary contacts 46 to cause the motor armature 47 to rotate in one direction, while at the other end of said core is a bar carrying insulated contacts 48 which coöperate with fixed contacts 49 to reverse the direction of rotation of said armature. When the beam 4 is in equilibrium the contact 37 stands midway between the contacts 38, 39 and the entire winding 42 of the solenoid is energized, holding its core in a central position with the armature circuits open, as shown in Fig. 6. If now there is a change in flow in the main it causes enough mercury to enter one of the cups to tilt the beam and close the circuit through the contact 37 and one of its coacting stationary contacts. This short-circuits that part of the solenoid winding connected to said stationary contact, and the effect of the other half of the winding is to pull the core toward that end of the solenoid, closing the motor circuit and starting it in a direction to shift the weight upwardly along the beam in order to restore its equilibrium. The return of the beam to a level position breaks the circuit at the contacts and allows the current to energize the entire solenoid, thereby bringing the core back to its central position and opening the motor circuit. This action is repeated each time a change in flow in the main takes place. The position of the weight along the beam indicates the flow at any instant, and the marker carried by the weight makes a permanent record on the chart. In order to stop the motor promptly when the circuit is opened, a resistance 50 is connected in shunt to the armature to absorb the current generated by the momentum of the armature.

In the form of meter shown in the Dodge application, above referred to, the mercury cups are cylindrical. The record sheet must, of course, be ruled in agreement with the law of variation of level of the mercury under varying degrees of velocity of flow of the steam or other fluid. The curve found by plotting the rate of flow against the difference in level (if pressure and quality of steam remain constant) is a parabola. The record sheet in the Dodge meter must, therefore, have a parabolic scale. Now, inasmuch as this scale is correct only for a given pressure and quality of the steam, the record must be corrected when other pressures and qualities exist. It is somewhat difficult to make these corrections accurately on a parabolic scale, and my invention has for its object the distortion of this naturally parabolic scale into a uniform or into a logarithmic or other suitable scale in order to render pressure and quality corrections more easy of accomplishment.

To produce a uniform scale, the two mercury cups are made of varying diameter so that for any certain similar increases in the rate of flow the weight always moves the same distance along the beam. Corrections for pressure and quality then consist of straight line relations and these corrections are simple. Correction may also be made so as to allow the same scale to be used for any diameter of pipe. Broadly speaking, I can obtain any scale by properly varying the diameter of the cups. I prefer to use two similar cups 10, 11 oppositely placed. These are set with their axes vertical and their greatest diameters in the same horizontal plane, the smallest diameter of cup 10 being below this plane, while that of cup 11 is an equal distance above it. The curvatures of the two cups are such that the surface areas of the mercury therein are always equal at corresponding levels. The law of curvature of the cup for a uniform scale I find to be expressed by the formula $$r = \sqrt{\frac{m \times w}{\sqrt{d} \times R \times .49 \times 3.1416}}$$

where $r$ represents the radius of the cup at any deflection or distance $d$ down from the zero level; $m$ being the movement of the weight in inches corresponding to a given value of $d$; $w$ the weight of said weight in pounds; $R$ the radius from the center line of the knife-edges to the center line of the cup, and .49 being the weight in pounds of a cubic inch of mercury. It will be seen that the only variables are $m$ and $d$, and that the square of the radius at successive distances from the zero level varies as the movement of the weight times a constant quantity divided by the square root of the deflection. The quantities $m$ and $d$ have been referred to as variables but for any given value of $d$ there is a definite and assigned value for $m$, which is determinable from the law expressing the relation of the two quantities. The particular shape derived by this rule is shown in Fig. 7. It will be observed that the radius shortens very rapidly during the first portion of the deflection from the zero level $x$, but during succeeding portions it becomes nearly constant. This results in a trumpet-shaped cup with a long stem and a suddenly flaring mouth. With cups of this shape, the weight will move along the beam by equal increments to compensate for equal variations in the flow of the steam, and the chart or record sheet or strip can be ruled off with lines at equal distances apart to represent, for example, pounds of steam; thereby greatly simplifying the reading and correction of the records made upon said chart.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is,

1. In a fluid meter, the combination with a tilting frame, of two communicating cups supported thereon on opposite sides of the axis of movement, a conduit connecting said cups, a volume of heavy liquid in said conduit and cups, means for subjecting said liquid to differences of fluid pressure, and a movable means for restoring the equilibrium of the frame, each of said cups decreasing in cross-section from a point of zero level, and the square of the radius at any given point being determined by a constant times the movement of said means divided by the square root of the corresponding distance of said point from the zero level.

2. In a fluid meter, the combination with a tilting frame, of two communicating trumpet-shaped cups supported thereon on opposite sides of the axis of movement, one of said cups being inverted, and both having their zero level in the same horizontal plane, a conduit connecting said cups, a volume of heavy liquid in said conduit and cups with its surface normally at the zero level, means for subjecting said liquid to differential fluid pressures, and means for restoring the equilibrium of said frame.

3. In a fluid meter, means for enabling the use of a record sheet of uniform scale comprising a tilting beam, a weight movable thereon, a marker actuated by the weight, two communicating trumpet-shaped cups one of which is inverted and both supported on said beam, the radius of a cup at any point depending upon a constant times the movement of the weight divided by the square root of the corresponding distance of said point from a plane of zero level, a conduit connecting said cups, a volume of heavy liquid in said conduit and cups, and means for subjecting said liquid to differential fluid pressures.

4. In a fluid meter, means for enabling the use of a record sheet of uniform scale, comprising a tilting beam, a weight movable thereon, a marker actuated by the weight, two communicating mercury cups supported on said beam on opposite sides of the fulcrum, said cups diminishing in area from a common zero level and being so arranged that the surface of the mercury in both cups is always of the same area irrespective of the degree of displacement thereof from the zero level, and means connecting said cups.

5. In a fluid meter, means for enabling the use of a record sheet of uniform scale comprising a tilting beam, two cups having a cross-section of varying radius and mounted on the beam at opposite sides of its axis of movement, a conduit connecting the cups, a body of liquid in the conduit and cups with its surface normally at zero level, means for subjecting the liquid to different fluid pressures, and means controlled by the beam for restoring the equilibrium of the said beam including a member movably mounted on the beam and a marker actuated by the member for making a record on the sheet, the square of the radius of the cups at any given point being equal to the movement of said member times its weight divided by a constant times the square root of the distance of the point from zero level.

6. In a fluid meter, the combination with a tilting frame, of a plurality of cups supported thereon in balanced relation to the axis of movement of the frame, conduit means connecting the cups, a body of liquid in the cups and their connecting means, a device for subjecting said liquid to differential fluid pressures, means controlled by the tilting frame for restoring the equilibrium of said frame after it has been tilted, and a recording device actuated by said restoring means including a scale, said cups diminishing in area from a normal zero level so that said scale is varied from a parabolic scale.

7. In a meter for measuring the flow of fluid through a main, the combination with a tilting beam or frame, of a weight movable thereon, means responsive to the flow of fluid through the main for tilting the beam, said means including a mercury column that is moved as the flow varies, and a cup for containing part of the column, said cup diminishing in cross-sectional area from a normal zero level, a containing means for the other part of the column, and a device actuated by the beam for moving the weight to restore said beam to a position of equilibrium after it has been tilted by said flow-responsive means.

8. In a meter for measuring the flow of fluid through a main, the combination of a scale beam, a hollow member supported by the beam, said member diminishing in cross-sectional area from one end toward the other, means whereby the weight of the contents of the member is automatically varied by changes in the rate of flow through the main, a counter-balance weight on the beam, and means whereby the weight is automatically moved along the beam to counterbalance any change in the weight of the contents of said member.

9. In a meter for measuring the flow of fluid through a main, the combination of a beam, two vessels supported on the beam, one at each side of its pivot, said vessels diminishing in cross-sectional area from a normal zero level, a connection between the vessels, the vessels and the connection containing a body of liquid of a greater density than that of the fluid to be measured, means whereby a change in the rate of flow through the main automatically changes the relative weights of the contents of the vessels, said changes of the weights of the contents tending to move the beam, and means for automatically compensating for the effect on the beam of any change in the relative weights of said contents.

In witness whereof, I have hereunto set my hand this 9th day of September, 1908.

HAROLD H. MAPELSDEN.

Witnesses:
BENJAMIN B. HULL,
MARGARET E. WOOLLEY.

Copies of this patent may be obtained for five cents each, by addressing the "Commissioner of Patents, Washington, D. C."